United States Patent Office 3,101,296
Patented Aug. 20, 1963

3,101,296
SYNERGISTIC INSECTICIDAL COMPOSITION
Mortimer T. Harvey, South Orange, N.J., assignor to Harvel Research Corporation, a corporation of New Jersey
No Drawing. Filed Nov. 9, 1959, Ser. No. 851,551
9 Claims. (Cl. 167—24)

The present invention relates to insecticidal compositions comprising a main insecticide and an auxiliary material which is a synergist for the main insecticide and which latter, in some of its examples, can act as a carrier base for the main insecticide, along with or without another base according to the relative solubility of the main insecticide and the auxiliary material with respect to each other.

The said main insecticides used in the practice of the present invention are those materials known as rotenone and rotenoids; pyrethrum and the other pyrethrins; and the chlorinated organic compounds such as 2,2-bis-(p-chlorphenyl)-1,1,1-trichlorethane, known as DDT and related materials; and 2,4 dichlorophenoxy acetic acid known as 2,4-D; and the gamma isomer of hexachlorocyclohexane (known as Lindane), dichlorodifluoromethane, ($CCl_2F_2$), and other chlorine fluorine derivatives of methane, and related materials.

The said other base can be deodorized kerosene (Deobase) and other refined petroleum oils tolerable to plants and animals and known as "white oils," and as summer oils and foliage oils. For some purposes such as those in which plant or animal tolerance are not necessary, petroleum oils in the less refined or even crude state can be used. Petroleum oils have certain insecticidal value and have other values in the insecticidal field such as solvent characteristics, and low surface tension and wetting characteristics. For some uses, such as in mosquito control, crude petroleum oils are used alone but due to intolerance by plants and animals, including fish, the crude petroleum oils are not used. Refined petroleum oils, however, are used in insecticides as solvents and bases for insecticides of higher insecticidal values such as those of the rotenone (rotenoid) and pyrethrum (pyrethrin) classes and the chlorinated hydrocarbon insecticides. However, due to the high cost of the pyrethrins, the comparative lower insecticidal value of the rotenoids and the mammalian toxicity of the chlorinated organic compounds, it is desirable to have a synergist for these insecticides to raise their insecticidal values.

I have discovered that hydrogenated condensation products of furfural and methyl ketones have certain characteristics which increase in value with amount or degree of hydrogenation and these characteristics are synergist value for the above identified main insecticides, solubility for said main insecticides and for refined petroleum oils (e.g. Deobase), low or no mammalian toxicity, low or no dermatitis effect, tolerable or pleasant odor, and non-staining whereby incidence of contact on clothing, upholstery and room walls is acceptable and tolerable. These hydrogenated condensation products are defined basically as those having the general formula

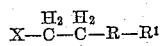

in which X represents radicals of the group

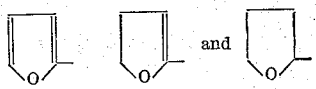

R is a radical of the group =C=O and

and $R^1$ is a hydrocarbon or carbohydrate, modified or not modified with S, P, N or halogen (Cl, F, B or I) atom or atoms.

This application is a continuation-in-part of the following copending applications: M. T. Harvey, Ser. No. 605,207, filed August 20, 1956; Harvey et al., Ser. No. 640,578, filed February 18, 1957, and Harvey et al., Ser. No. 772,177, filed November 6, 1958, all now abandoned.

Examples of hydrogenated furfural-ketone condensation products and methods of making furfural-ketones and hydrogenation products are given in my U.S. Patents Nos. 2,600,403 and 2,600,764 issued June 17, 1952, to which reference is hereby made as part of this disclosure.

The hydrogenation products of furfural ketones useful in the practice of the present invention are described generally as those of the following formulas:

(I) 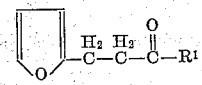

(II) 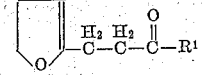

(III) 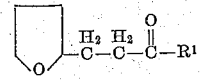

and (IV) 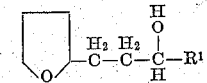

in which $R^1$ is a hydrocarbon or a carbohydrate radical. The term "carbohydrate radical" as here used is considered to include hydrocarbon or carbohydrate radicals having one or more of the radicals =C=O and

However, along with compounds I, II, III and IV there will be formed other compounds which represent various combinations and permutations of hydrogenation at the three carbon to carbon double bonds and at the

radical of which the following are illustrative examples:

(V) 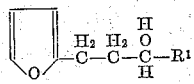

and (VI) 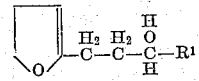

but one of the compounds (I) to (IV), inclusive, will usually predominate in the reaction mass at any of the four degrees of hydrogenation represented by said compounds represented by the formulas (I) to (IV). The —$R^1$ represents one of any radical of one to twenty-two carbon atoms either in straight or branched chain with or without radicals of ring compounds thereon (such as one of the furan radicals, the phenyl radical or the cyclic hexane radical). And the radical —R¹ can contain one or more carbon to carbon straight chain double bond, one or more =C=O radicals and/or one or more =C—OH radicals. An essential characteristic of the compounds (I) to (VI) as used in the present invention is that there is a furan ring connected by a

radical to either a =C=O radical or to a

radical. And during hydrogenation steps to obtain one or more of said compounds (I) to (VI), when R¹ contains an unsaturated carbon to carbon double bond, a =C=O radical or a

radical, hydrogenation in R¹ can take place during or after hydrogenation such as takes place in the illustrative general Examples I to VI described above.

Specific examples of the furfural ketone compounds which when hydrogenated are useful in the practice of the present invention are as follows:

(a) 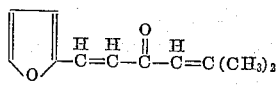

(b) 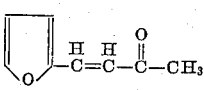

(c) 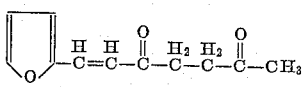

(d) 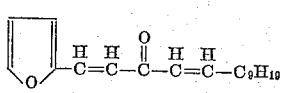

(e) 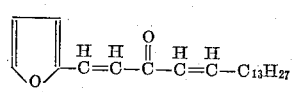

(f) 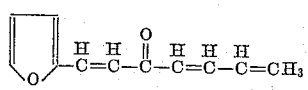

(g) 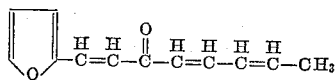

(h) 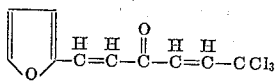

(i) 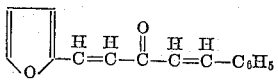

(k) 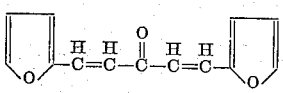

(m) 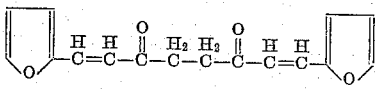

In the claims the hydrogenated furfural ketone compounds used in the practice of the present invention are represented generically by the formulas such as

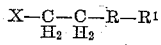

in which R¹ is stated to be a hydrocarbon or a carbohydrate and for the purposes of this disclosure the term "hydrocarbon" is intended to cover radicals such as

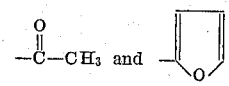

as exemplified in the above examples.

HYDROGENATED FURFURAL KETONES

FAHI

FAHI, as made in accordance with the disclosures in my said U.S. Patents Nos. 2,600,403 and 2,600,764 and distilled at 90° C. at 5 mm. of Hg pressure contains about ten moles of:

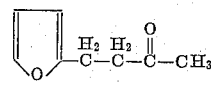

to one mole of

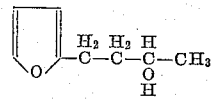

Reference is also hereby made to my said U.S. Patent 2,600,764 for the description of a method of making monofurfural acetone:

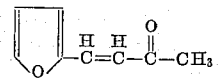

and for the method of hydrogenating the latter compound to produce the monofurfuryl acetone which latter has the molecular weight of 138, boiling point of 75° C. at 1 mm. of mercury, specific gravity of 1,035, freezing point at −55° C., and is soluble in alcohols, ketones, benzene and other aromatic solvents, organic esters, and cashew nut shell liquid and other phenols. As noted elsewhere, FAHI is soluble to the extent of about 1 part to about 8 parts of kerosene.

FAHI dissolves pyrethrum and other insecticidal pyrethrins, rotenone and other insecticidal rotenoids, DDT, 2,4-D and Lindane (the chemical formulas for the latter three materials are given elsewhere herein). Rotenone is completely soluble in FAHI. DDT is soluble up to a 25% concentrate in FAHI.

FAHII

When desired, the hydrogenated product FAHII:

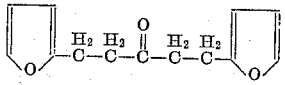

can be produced either by itself or along with the hydrogenated product FAHI by control of proportional quantities of reactants furfural and acetone, by extent of hydrogenation and by control of separation steps such as of fractionating temperatures of distillation, product FAHII being a hydrogenation product of product (k).

FAH2

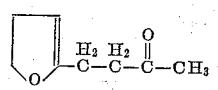

4-(4,5 dihydro alpha furyl)-2-butanone. This compound, herein called FHA2, has a specific gravity of 1.080 and analysis of a first distillate from a hydrogenation reaction mass showed the presence of about 2.7% of the distillate as having —OH radical at the place of the ketone radical originally present. This distillate was taken at 111° C. at about 18 mm. of mercury.

FMHI

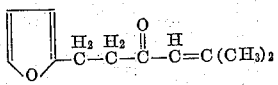

monofurfuryl mesityl oxide. This compound, monofurfural mesityl oxide when hydrogenated to the extent of one carbon-to-carbon double bond per molecule, distills at about 127° C. at 15 mm. of mercury.

FMEHI

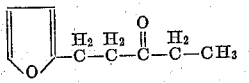

monofurfuryl methyl ethyl ketone. This compound, monofurfural methyl ethyl ketone when hydrogenated to the extent of one carbon-to-carbon double bond per molecule, distills at about 106° C. at 15 mm. of mercury.

FMIPHI

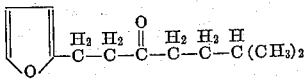

monofurfuryl methyl isopropyl ketone. This compound, monofurfural methyl isopropyl ketone when hydrogenated to the extent of one carbon-to-carbon double bond per molecule, distills at 105–115° C. at about 15 mm. of mercury.

FMIBHI

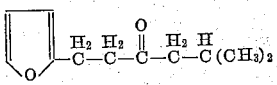

monofurfuryl methylisobutyl ketone. This compound, monofurfural methyl isobutyl ketone when hydrogenated to the extent of one carbon-to-carbon double bond per molecule, distills at about 130° C. at 15 mm. of mercury.

The effectiveness of FAHI, submitted for evaluation as a possible insecticide, was determined in tests for the control of mosquito larvae and two-spotted mite. Insecticidal evaluations were made with the photomigration method using Aëdes aegypti (L.) mosquito larvae. This method has been perfected into a precision bioassay by taking advantage of the negative phototropic response of mosquito larvae.

Having determined the insecticidal activity in p.p.m. on mosquito larvae, the material was then sprayed on Tendergreen bean plants infected with two-spotted mite, Tetranychus bimaculatus Harvey. Triton X-155 was used as a wetting agent. Parathion (O,O-diethyl O-p-nitrophenyl thiophosphate), Diland (1 part of 1,1-bis(p-chlorophenyl)-2-nitropropane and 2 parts of 1,1-bis (p-chlorophenyl)-2-nitrobutane) and Ovotran (p-chlorophenyl p-chlorobenzene sulfonate) were used as standards.

The materials were sprayed with a De Vilbiss spray gun (Model CH 6-2041) adjusted to spray 110 ml. in 30 seconds at a pressure of 40 lbs. per sq. in. The potted plants were placed on a rotating table to insure uniform deposit of material. Immediately after spraying the plants were removed to a holding room maintained at 80° F. and a relative humidity of 50%. Counts of living and dead mites were made under a binocular microscope.

*Results of photomigration tests on mosquito larvae.*— FAHI was tested at concentrations ranging from 10 to 1000 p.p.m. The active range in 1 hour tests was 300 to 600 p.p.m. In 24 hours 100 p.p.m. gave 44% moribund as compared with 97% for DDT at .0016 p.p.m.

*Table A.—Effectiveness of FAHI on Photomigration of Mosquito Larvae*

ONE HOUR TEST

| Compound | Concentration p.p.m. | Percent moribund |
|---|---|---|
| FAHI | 1,000 | 100 |
| FAHI | 500 | 81 |
| FAHI | 100 | 31 |
| FAHI | 50 | 3 |
| FAHI | 10 | 3 |

24 HOUR TEST

| Compound | Concentration p.p.m. | Percent moribund |
|---|---|---|
| FAHI | 100 | 44 |
| FAHI | 50 | 08 |
| FAHI | 10 | 03 |
| DDT | .0016 | 97 |
| Acetone | .5% | 04 |

*Table B*

ONE HOUR TEST

| Compound | Concentration p.p.m. | Percent moribund |
|---|---|---|
| FAHI | 200 | 8 |
| FAHI | 400 | 63 |
| FAHI | 500 | 92 |
| FAHI | 550 | 94 |
| FAHI | 600 | 100 |
| FAHI | 800 | 100 |
| DDT | 0.1 | 99 |
| Acetone | 1% | 0 |

*Table C*

ONE HOUR TEST

| Compound | Concentration p.p.m. | Percent moribund |
|---|---|---|
| FAHI | 100 | 10 |
| FAHI | 200 | 18 |
| FAHI | 300 | 61 |
| FAHI | 400 | 87 |
| FAHI | 500 | 96 |
| FAHI | 600 | 100 |
| FAHI | 700 | 100 |
| FAHI | 800 | 100 |
| FAHI | 900 | 100 |
| FAHI | 1,000 | 100 |
| DDT | 0.1 | 100 |
| Acetone | 1% | 0 |

*Table D.—Effectiveness of FAHI on Photomigration of Mosquito Larvae*

ONE HOUR TEST

| Compound | Concentration p.p.m. | Percent moribund |
|---|---|---|
| FAHI | 200 | 5 |
| FAHI | 400 | 33 |
| FAHI | 500 | 70 |
| FAHI | 600 | 96 |
| FAHI | 800 | 100 |
| DDT | .021 | 50 |
| Acetone | 1% | 0 |

*Results of Tests on Two-Spotted Mite.*—It will be noted in Table E that FAHI gave a kill of young and adult two-spotted mite, Tetranychus bimaculatus Harvey of 83% at 500 p.p.m., 90% at 600 p.p.m. and 95% at 1000 p.p.m. in 48 hours. This compares with Ovotran at 200 mg./100 ml. for the same period. FAHI also possesses ovicidal action as the kills were 88% at 300 p.p.m. and 93% at 600 p.p.m. and at 1000 p.p.m. at the end of 7 days. This compares with 91% kill for Ovotran.

Table E.—*Effectiveness of FAHI on Adult and Young of Two-Spotted Mite 48 Hours After Spraying and Ovicidal Action at End of 7 Days*

| Compound | Concentration | Number mites | Percent kill corrected for blank (48 hr. count) | Number mites | Percent kill corrected for blank at end of 7 days |
|---|---|---|---|---|---|
| Oratran | 50 mg./100 ml | 45 | 55 | 61 | 26 |
| Do | 100 mg./100 ml | 41 | 67 | 55 | 83 |
| Do | 200 mg./100 ml | 52 | 90 | 60 | 91 |
| Wetting agt. Titron X-155. | 1.0% | 49 | 0 | 46 | 0 |
| Check | | 49 | 0 | 43 | 0 |
| FAHI | 300 p.p.m | 44 | 73 | 57 | 70 |
| FAHI | 600 p.p.m | 50 | 80 | 61 | 86 |
| Oratran | 50 mg./100 ml | 68 | 10 | 33 | 43 |
| Do | 100 mg./100 ml | 50 | 11 | 39 | 78 |
| Do | 200 mg./100 ml | 41 | 90 | 53 | 93 |
| Wetting agt. | 1.0% | 51 | 1 | 59 | 15 |
| Check | | 43 | 0 | 54 | 0 |
| FAHI | 300 p.p.m | 39 | 3 | 71 | 56 |
| FAHI | 500 p.p.m | 43 | 33 | 54 | 88 |
| FAHI | 600 p.p.m | 41 | 90 | 51 | 93 |
| FAHI | 1,000 p.p.m | 43 | 95 | 50 | 93 |

The following experiments were conducted with FAHI as a carrier and synergist of pyrethins on the housefly, *Musca domestica* L. and as a carrier and synergist of rotenone of the southern armyworm, *Prodenia eridania* (Cram) and the two-spotted mite, *Tetranychus bimaculatus* Harvey.

LARGE GROUP PEET-GRADY TEST RESULTS

FAHI appears to synergize pyrethins. There is no question as to the increased activity of pyrethrins in FAHI as compared with Deobase (Table 1).

In Table 2, results are shown for 100 mg. of pyrethrins in Deobase (1) and in a mixture containing 90 ml. of Deobase and 10 ml. of FAHI (2). Increased kill and knockdown are probably statistically significant for (2) over that of (1). Note high kill results for Test No. 1. Higher volumes of FAHI in Deobase were not tested as a solvent coupler would be needed. About 10% by volume of FAHI seemed to be the maximum without separation of diluents. These tests suggest considerable activity and interest for FAHI.

Table 1.—*FAHI and Deobase Compared as Carriers for Pyrethrins by the Large Group Peet-Grady Test Method*

| Formulation | Percent kill for 24 hours | Percent knockdown | | |
|---|---|---|---|---|
| | | 3 min. | 5 min. | 10 min. |
| 50 mg. pyrethrins in deobase: | | | | |
| (1) | 30.4 | 65.5 | 76.5 | 82.8 |
| (2) | 21.4 | 72.5 | 77.8 | 82.0 |
| (3) | 24.6 | 65.4 | 73.9 | 78.9 |
| Average | 25.5 | 67.8 | 76.1 | 81.2 |
| 50 mg. pyrethrins in FAHI: | | | | |
| (1) | 42.9 | 87.6 | 97.8 | 99.5 |
| (2) | 52.9 | 86.5 | 95.9 | 99.4 |
| (3) | 38.9 | 88.8 | 95.3 | 99.0 |
| Average | 44.9 | 87.6 | 96.3 | 99.3 |
| FAHI (alone): (3) | 6.1 | | 54.7 | 69.5 |
| O.T.I. (official test insecticide): | | | | |
| 1st day (1) | 40.1 | 84.3 | 89.1 | 90.9 |
| 2nd day (2) | 36.0 | 89.3 | 92.1 | 94.0 |
| 5th day (3) | 35.8 | 90.6 | 92.5 | 96.7 |
| Average | 37.3 | 88.1 | 91.2 | 93.9 |

Table 2.—*Large Group Peet-Grady Test Results Comparing Pyrethrins Formulated in Deobas and in a Combination of Deobase Plus FAHI*

| Formulation | Percent kill for 24 hours | Percent knockdown | | |
|---|---|---|---|---|
| | | 3 min. | 5 min. | 10 min. |
| 100 mg. pyrethrins in 100 ml. deobase: | | | | |
| (1) | 25.9 | 81.4 | 86.8 | 91.4 |
| (2) | 33.9 | 89.1 | 93.0 | 96.2 |
| (3) | 31.0 | 87.3 | 93.0 | 94.7 |
| (4) | 26.9 | 83.4 | 90.9 | 92.5 |
| Average | 29.4 | 85.3 | 90.9 | 93.7 |
| 100 mg. pyrethrins in 90 ml. deobase plus 10 ml. FAHI: | | | | |
| (1) | 55.7 | 91.1 | 94.0 | 95.0 |
| (2) | 32.6 | 95.1 | 96.8 | 98.1 |
| (3) | 30.9 | 91.9 | 96.1 | 96.8 |
| (4) | 39.7 | 95.0 | 96.5 | 97.0 |
| Average | 39.7 | 93.3 | 95.9 | 96.7 |
| O.T.I. (official test insecticide): | | | | |
| (1) | 36.0 | 83.9 | 88.9 | 92.0 |
| (2) | 34.0 | 88.1 | 92.7 | 95.3 |
| (3) | 28.6 | 90.0 | 91.4 | 95.0 |
| (4) | 37.8 | 86.0 | 91.6 | 96.1 |
| Average | 34.1 | 87.0 | 91.2 | 94.6 |

Table 3.—*Results of Tests With Adult and Young of Two-Spotted Mite 48 Hours After Spraying and Ovicidal Action at End of 7 Days*

| Compound | Conc., p.p.m. | Number mites, 48 hr. count | Percent kill corrected for blank 48 hrs. | Number mites, 7 day count | Percent kill corrected for blank 7 days |
|---|---|---|---|---|---|
| Malathion | 10 | 43 | 79 | 21 | 78 |
| Do | 20 | 46 | 78 | 31 | 78 |
| Do | 40 | 46 | 91 | 31 | 97 |
| FAHI | 400 | | | | |
| Rotenone C.P. | 2,500 | 51 | 87 | 18 | 97 |
| Wetting agent check | 1% | 44 | 0 | 29 | 0 |

RESULTS OF TESTS ON TWO-SPOTTED MITE

In the foregoing Table 3 potted bean plants were sprayed with a solution consisting of FAHI 400 p.p.m. and rotenone, C.P. 2500 p.p.m. This solution gave a kill of 87% in 48 hours to adult and young two-spotted mite and an ovicidal effect in 7 days of 97%. This compared with Malathion (O,O-dimethyl-5-(1,2-dicarboxyethyl)dithiosulphate) at 40 p.p.m. which gave a kill of 91% of adults and young and a 7-day ovicidal effect of 97%. (For method of spraying see Hartsell, A., Harry L. Haymes and Donald P. Connola, C.B.T.I. 15: 131–140, 1948.)

RESULTS OF TESTS ON SOUTHERN ARMYWORM

In making up solutions to be tested on the southern armyworm direct quantities of FAHI, acetone and rotenone (100% tech.) were added to water containing a wetting agent (0.5% Triton-X155). Bean leaves were emersed in the solutions for 30 seconds and slowly moved about to insure complete coverage. The leaves were allowed to dry at room temperature and placed in Petri dishes with two filter paper discs moistened with 1 ml. of water. Four larvae were added to each dish and the tests run in duplicate. After the larvae had been in contact with the bean leaves for 72 hours, counts of percent of leaf consumed and percent kill were established. The results of these tests appear in Tables 4 and 5.

Rotenone at a concentration of 4500 p.p.m. gave a kill of 38% and 90% protection of foliage. Rotenone at the same concentration and FAHI at 1000 p.p.m. gave 50% kill and 85% protection of foliage. When 10 p.p.m. of FAHI was present in 5000 through 8000 p.p.m. of rotenone, percent kill was increased. Activity was also increased for rotenone at 10,000 p.p.m. when 100 p.p.m. of FAHI was present. As the concentration of FAHI was increased the protection of foliage increased up to concentrations of 8000 p.p.m.

*Table 4.—Results of Southern Armyworm Tests*

| Chemical | Concentration in p.p.m. | Total number larvae | Percent kill | Percent bean leaf eaten |
|---|---|---|---|---|
| Rotenone, in acetone | 4,500 | 8 | 38 | 10 |
| Rotenone | 4,500 | 8 | 25 | 35 |
| FAHI | 10 | | | |
| Rotenone | 4,500 | 8 | 0 | 15 |
| FAHI | 100 | | | |
| Rotenone | 4,500 | 8 | 50 | 15 |
| FAHI | 1,000 | | | |
| Rotenone | 5,000 | 8 | 25 | 0.5 |
| Rotenone | 5,000 | 8 | 38 | 10 |
| FAHI | 10 | | | |
| Rotenone | 5,000 | 8 | 25 | 0.5 |
| FAHI | 100 | | | |
| Rotenone | 6,000 | 16 | 88 | 0.5 |
| Rotenone | 6,000 | 17 | 94 | 0.1 |
| FAHI | 10 | | | |
| Rotenone | 6,000 | 16 | 81 | 0.5 |
| FAHI | 100 | | | |
| Rotenone | 6,000 | 16 | 75 | 0.3 |
| FAHI | 1,000 | | | |
| Rotenone | 8,000 | 16 | 75 | 0.5 |
| Rotenone | 8,000 | 16 | 88 | 0.5 |
| FAHI | 10 | | | |
| Rotenone | 8,000 | 16 | 81 | 0.4 |
| FAHI | 100 | | | |
| Rotenone | 8,000 | 16 | 81 | 0.2 |
| FAHI | 1,000 | | | |
| Rotenone | 10,000 | 16 | 75 | 0.2 |
| Rotenone | 10,000 | 16 | 56 | 0.5 |
| FAHI | 10 | | | |
| Rotenone | 10,000 | 16 | 81 | 0.2 |
| FAHI | 100 | | | |
| Rotenone | 10,000 | 16 | 69 | 0.2 |
| FAHI | 1,000 | | | |

A second series of tests were conducted to determine at what concentration of rotenone could be prepared using FAHI as a solvent (Table 5). Stock solutions of 5% and 10% in FAHI were made up. Rotenone was completely soluble in FAHI at both concentrations while only completely soluble in acetone at 5%. Increasing concentrations of FAHI (3% to 6%) were used with increasing concentrations of rotenone. Rotenone in acetone was superior to rotenone in FAHI in toxicity to the larvae but foliage protection was greater when FAHI was used as the solvent. 10% concentrates were tested and gave higher kills of larvae and increased protection to bean foliage. A 3% concentration of FAHI also gave complete kill of larvae.

*Table 5.—Results of Southern Armyworm Tests*

| Chemical | Conc. of stock solution | Concentration[1] | Total number larvae | Percent kill | Percent bean leaf eaten |
|---|---|---|---|---|---|
| Rotenone | | 1,500 p.p.m. | 8 | 38 | 20 |
| FAHI | 10% | 1.5% | | | |
| Rotenone | | 3,000 p.p.m. | 8 | 100 | 0 |
| FAHI | 10% | 3% | | | |
| FAHI | 2.5% | | 6 | 0 | 15 |
| FAHI | 3% | | 8 | 100 | 0 |
| Acetone | 6% | | 8 | 0 | 100 |
| DDT | 38 p.p.m. | | 8 | 25 | 75 |
| DDT | 75 p.p.m. | | 8 | 63 | 50 |
| DDT | 150 p.p.m. | | 8 | 88 | 0.5 |
| Wetting agent | 1% | | 8 | 0 | 100 |

[1] Figures in p.p.m. refer to active ingredient (rotenone); figures in percent refer to carrier FAHI or acetone.

MISCELLANEOUS OBSERVATIONS ON TEST RESULTS

No phytotoxic effects were noted on bean foliage with potted plants at 400 p.o.m. as was used in two-spotted mite tests.

The 5% concentrate appeared temperature stable at ranges of 5°–60° C. as indicated by absence of precipitate. It is also possible to make up a 25% concentrate of D.D.T. in FAHI.

Tests with FAHI indicate considerable activity and interest as a carrier and synergist of pyrethrins in place of Deobase.

For agricultural sprays FAHI showed promise as a solvent of rotenone with tests made on the two-spotted mite and southern armyworm.

TESTS FOR TOXICITY OF HYDROGENATED FURFURAL-KETONES

These materials, FAHI, FAH2 and FAHII were tested for oral toxicity, as follows:

Method: Adult, male, albino rats of the Sprague-Dawley strain weighing approximately 200 g. were used for this work. The animals were housed in individual, screen bottom cages and provided with a commercial laboratory chow and water ad libitum except that the rats were fasted overnight just prior to treatment. The samples were administered via stomach tube and graduated syringe in calculated amounts. The animals were closely observed for evidences of toxicity for a period of one week following treatment.

Results:

| Compound tested | Dose (cc./kg.) | Animals treated | Animals killed |
|---|---|---|---|
| FAHI | 0.2 | 2 | 0 |
| FAHI | 0.5 | 2 | 1 |
| FAHI | 1 | 2 | 2 |
| FAHII | 1 | 2 | 0 |
| FAHII | 10 | 2 | 2 |
| FAH2 | 1 | 2 | 0 |
| FAH2 | 5 | 2 | 0 |
| FAH2 | 10 | 2 | 1 |
| FAH2 | 15 | 2 | 2 |

Conclusion: Under the test conditions outlined above, the samples have acute oral LD 50 values for the rat approximately as tabulated below:

Approx. LD 50 (cc./kg.)
FAHI _____ 0.5
FAHII _____ 1–10
FAH2 _____ 10

It can be seen from a consideration of the above that in the hydrogenated furfural-ketone products described, the greater the degree of hydrogenation the greater are both the insecticidal value of the material and the synergistic value thereof and also the lesser the degree of oral toxicity thereof. This is considered to be an unexpected result, not shown or indicated by any known prior art.

While the products (3) have been generally exemplified by the particular compounds (a) to (m) above, said compounds (a) to (m) are given not by way of limitations, it being considered that straight chain and branched chain compounds are included in products (3) and that the branches can have the furane-ketone relationship described hereinabove, for illustrative examples,

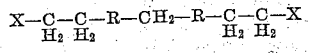

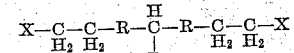

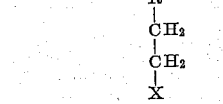

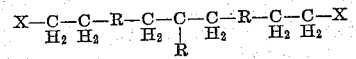

and

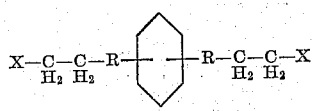

where R is a radical of the group

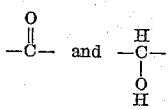

and X represents any of the radicals

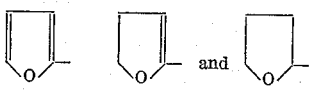

and wherein although all of the

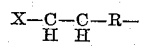

groups are shown as having the

radicals completely hydrogenated for preferred embodiments, it is understood that the scope of the present invention starts with at least one of said radical

being completely hydrogenated, the inventive criterion in one respect being decrease of mammal toxicity with decrease in percentage of X—C=C—R— present in molecule and in another respect increase in insecticidal or of insecticidal synergist value with increase in

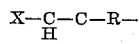

present in the molecule.

The base (2) can be of various kinds, for example, the mineral oil bases exemplified by deodorized kerosine; emulsions containing soaps and soap solutions; and gases such as dichlorodifluoromethane and other halogenated carbon compounds such as are used for spray or mist application of liquid and finely divided dust products or of solid material in solution or suspension in a liquid, as in aerosol bombs and in airplane sprays.

An example of an emulsion which includes the material of the present invention is as follows:

20 parts by weight of oleic acid and
70 parts of a 5% solution of NaOH are heated together to form the sodium oleate to which
50 parts of a mixture containing equal parts by weight of FAH2 (or FAHI) and of commercial insecticidal pyrethrin or of pyrethrin flowers in fine-dust form This mixture makes a homogeneous emulsion which can be used in the proportions set forth or can be diluted with an equal volume of water.

Any of the materials FAHII, FAHI, FMEHI, FMIPHI or FMIBI can be used in place of the FAH2 (or FAHI) in the above formula, and in place of the pyrethrin material, an equal amount of rotenone or of chlorinated hydrocarbon can be used.

Reference is hereby made to "Chemistry and Uses of Pesticides" (1956), Second Edition, E. R. de Ong, published by Reinhold Publishing Co., of New York, N.Y., for general formulations in which the hydrogenated furfural-ketone reaction products of the present invention can be used as synergist with the insecticidal materials, for illustrative example, in equal amounts by weight with the insecticidal material.

The examples given are illustrative and not limiting.

Two parts to five parts by weight of any of the hydrogenated furfural-ketone products together with two parts to five parts of any of the pyrethrin, rotenone or halogenated hydrocarbons in about one hundred to two hundred parts of kerosene ("Deobase" for example) is an example of the use of a liquid base for the products of the present invention.

I claim:

1. In an insecticidal composition, in combination (a) insecticidal material selected from the group consisting of the pyrethrins, rotenones and halogenated hydrocarbons and (b) a synergist compound comprising a completely saturated carbon chain having a terminal radical at each end thereof, one of said terminal radicals being selected from the group consisting of the three rings:

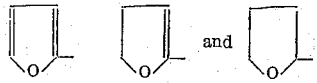

and the other terminal radical being selected from the group consisting of the aforesaid three rings and alkyl, said carbon chain including as a part thereof intermediate said terminal radicals a radical selected from the group consisting of

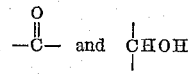

which intermediate radical is separated from the terminal radical when the terminal radical is one of the aforesaid three rings by the group —CH₂—CH₂— forming a part of said carbon chain and which intermediate radical is attached directly to the terminal radical when the terminal radical is the said alkyl group.

2. An insecticidal composition as defined in claim 1, in which the halogenated hydrocarbon is 2,2-bis-(p-chlorphenyl)-1,1,1-trichlorethane.

3. An insecticidal composition as defined in claim 1, in which the halogenated hydrocarbon is 2,4 dichlorophenoxy acetic acid.

4. An insecticidal composition as defined in claim 1, in which the halogenated hydrocarbon is gamma isomer of hexachlorocyclohexane.

5. An insecticidal composition as defined in claim 1, in which the halogenated hydrocarbon is dichlorodifluoromethane.

6. An insecticidal composition as defined in claim 1, with (b) being

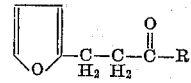

in which R is an alkyl radical.

7. In an insecticidal composition, in combination (a) insecticidal material selected from the group consisting of the pyrethrins, rotenones, and halogenated hydrocarbons and (b) a compound represented by

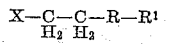

in which X represents a radical selected from the group consisting of:

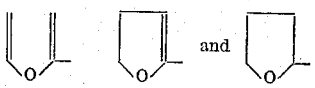

R is a radical selected from the group consisting of

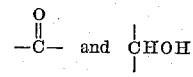

and R¹ is an alkyl radical.

8. In an insecticidal composition, in combination, (a) a pyrethrin and (b) a compound represented by

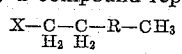

in which X represents a radical selected from the group consisting of:

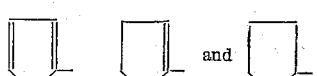

and R represents a radical selected from the group consisting of

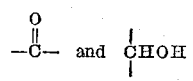

9. In an insecticidal composition, in combination, (a) a pyrethrin and (b) a compound represented by

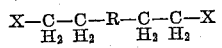

in which each X represents a radical selected from the group consisting of:

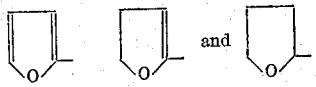

and R represents a radical selected from the group consisting of

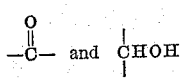

References Cited in the file of this patent

UNITED STATES PATENTS

| | | |
|---|---|---|
| 2,146,258 | Goodhue | Feb. 7, 1939 |
| 2,212,529 | Swaine | Aug. 27, 1940 |
| 2,537,021 | Bartlett | Jan. 9, 1951 |

OTHER REFERENCES

Drake: Abstract of application S.N. 70,382.
Stewart: Abstract of application S.N. 707,526.
Eddy: Jour. Eco. Ent. 47, June 1954, p. 501.